(12) United States Patent
Lee et al.

(10) Patent No.: US 7,958,566 B2
(45) Date of Patent: Jun. 7, 2011

(54) AFM PROBE WITH VARIABLE STIFFNESS

(75) Inventors: Hak-Joo Lee, Daejeon (KR); Seung Min Hyun, Daejeon (KR); Jae Hyun Kim, Daejeon (KR); Jung Yup Kim, Daejeon (KR); Seung Woo Han, Daejeon (KR); Jung Min Park, Daejeon (KR); Byung Ik Choi, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 683 days.

(21) Appl. No.: 11/962,037

(22) Filed: Dec. 20, 2007

(65) Prior Publication Data

US 2008/0190182 A1 Aug. 14, 2008

(30) Foreign Application Priority Data

Feb. 9, 2007 (KR) .................. 10-2007-0013567

(51) Int. Cl.
G01Q 60/38 (2010.01)
G01Q 60/40 (2010.01)
G01Q 10/00 (2010.01)
G01Q 20/00 (2010.01)
G01Q 80/00 (2010.01)
G01N 3/42 (2006.01)

(52) U.S. Cl. ......... 850/40; 73/81; 850/1; 850/5; 850/41; 850/62

(58) Field of Classification Search ...... 73/81; 850/1–2, 850/5, 7, 40–41, 62
See application file for complete search history.

(56) References Cited

U.S. PATENT DOCUMENTS

| 5,245,863 | A | * | 9/1993 | Kajimura et al. ........... 850/41 X |
| 5,767,514 | A | | 6/1998 | Lloyd |
| 5,801,472 | A | | 9/1998 | Wada et al. |
| 5,866,807 | A | | 2/1999 | Elings et al. |
| 5,869,751 | A | | 2/1999 | Bonin |
| 6,220,084 | B1 | * | 4/2001 | Chen et al. ..................... 73/105 |
| 6,525,316 | B1 | | 2/2003 | Howald |

(Continued)

FOREIGN PATENT DOCUMENTS

EP 1 178 299 A1 2/2002

(Continued)

OTHER PUBLICATIONS

Xuefeng Wang et al. Scanning Probe Lithography Tips Sith Spring-on-Tip Designs: Analysis, Fabrication, and Testing, Applied Physics Letters 87 (2005), doc 054102.

(Continued)

Primary Examiner — Thomas P Noland
(74) Attorney, Agent, or Firm — Knobbe Martens Olson & Bear LLP (57) ABSTRACT

Disclosed is an atomic force microscope (AFM) probe for use in an AFM, and more particularly, an AFM probe suitable for testing the topography and mechanical properties of a microstructure having a size on the order of micrometers or nanometers. To this end, an AFM probe according to the present invention comprises an elastically deformable frame having a fixed end and a movable end on one axis; an AFM tip supported by the movable end to be movable against a test sample in a direction of the axis; and a stopper provided on an inner surface of the frame to control a movement of the AFM tip within a predetermined range.

24 Claims, 5 Drawing Sheets

U.S. PATENT DOCUMENTS

| | | | |
|---|---|---|---|
| 6,552,339 B1 * | 4/2003 | Gupta et al. | 850/40 X |
| 6,578,410 B1 | 6/2003 | Israelachvili | |
| 7,115,863 B1 * | 10/2006 | Ishibashi et al. | 250/306 |
| 7,246,517 B2 | 7/2007 | Lee et al. | |
| 7,285,792 B2 * | 10/2007 | Watanabe et al. | 250/492.2 |
| 7,472,585 B2 * | 1/2009 | Abramovitch | 73/105 |
| 7,570,061 B2 * | 8/2009 | Kuroda et al. | 324/327 |
| 7,685,869 B2 * | 3/2010 | Bonilla et al. | 73/81 X |
| 2007/0103697 A1 * | 5/2007 | Degertekin | 356/501 |
| 2007/0214864 A1 * | 9/2007 | Proksch | 73/1.79 |
| 2008/0087077 A1 * | 4/2008 | Mininni | 73/105 |

FOREIGN PATENT DOCUMENTS

| | | |
|---|---|---|
| JP | 2725741 B2 | 12/1997 |
| JP | 11-014641 A | 1/1999 |
| JP | 2000-258331 A | 9/2000 |
| JP | 2000-258332 A | 9/2000 |
| JP | 2001-062791 A | 3/2001 |
| JP | 2004-085220 A | 3/2004 |
| JP | 2007-040743 A | 2/2007 |
| KR | 10-0612595 B1 | 8/2006 |
| WO | 99/45361 A1 | 9/1999 |
| WO | 2005/066609 A1 | 7/2005 |
| WO | 2006/138697 A2 | 12/2006 |

OTHER PUBLICATIONS

Search Report issued May 29, 2008 in corresponding European patent application No. 07150356.9 in 6 pages.

* cited by examiner

AFM PROBE WITH VARIABLE STIFFNESS

CROSS-REFERENCE TO RELATED APPLICATION

This application claims priority to and the benefit of Korean Patent Application No. 10-2007-000013567, filed Feb. 9, 2007, the disclosure of which is incorporated herein by reference in its entirety.

BACKGROUND

1. Field

The present disclosure relates to an atomic force microscope (AFM) probe for use in an AFM, and more particularly, to an AFM probe suitable for testing the topography and mechanical properties of a microstructure having a size on the order of micrometers or nanometers.

2. Discussion of the Related Technology

Microstructures having sizes on the order of micrometers or nanometers are used for micro electro mechanical system (MEMS) devices, micro electronic devices or photoelectron devices. In order to design or fabricate such devices, it is required to test the topography and mechanical properties of such microstructures for use in the devices.

An AFM was developed to primarily measure the surface topography of a test sample of a microstructure. However, as it has been recognized that the AFM can be used for a high-resolution test of a small load and displacement for a microstructure, a function of testing mechanical properties, particularly, a nano-indentation test function is added thereto, thereby enabling measurement of mechanical properties such as a modulus of elasticity and hardness of a micro test sample, which could not be measured by any conventional test equipment.

An AFM having a nano-indentation test function employs an AFM cantilever slantly extending from a fixed end to a movable end at an angle and having an AFM tip mounted at the movable end. The slant structure of the AFM cantilever causes the AFM tip pressed by a test sample to produce an unnecessary displacement in a horizontal direction in addition to a displacement in a vertical direction. In case of a surface topography test of a test sample, the horizontal displacement of the AFM tip is negligible. However, in case of an indentation test of a test sample, large errors are caused in measured values of mechanical properties such as a modulus of elasticity and hardness of the test sample. In addition, the AFM cantilever has fixed stiffness, which cannot meet both a surface topography test of a test sample requiring low stiffness in the AFM cantilever and an indentation test of a test sample requiring high stiffness in the AFM cantilever.

Korean Patent No. 612595 issued to the present applicant discloses a technique related to an AFM probe having a structure that allows a displacement of an AFM tip in a vertical direction but suppresses a displacement of the AFM tip in a horizontal direction. The disclosed conventional technique suggests the structure of an AFM probe having a frame that is constructed symmetrically with respect to one axis and has an AFM tip mounted at a movable end passing through the axis.

According to the conventional technique, the horizontal displacement of the AFM tip due to a test sample is prevented to greatly decrease any error of measured values of mechanical properties, which may be caused by the horizontal displacement, in an indentation test of a test sample. However, since the frame of the conventional technique also has fixed stiffness, there are limitations on use thereof in that the conventional AFM probe cannot be used in common for both a surface topography test of a test sample requiring low stiffness in the AFM probe and an indentation test of a test sample requiring high stiffness in the AFM probe.

The foregoing discussion in this section is to provide general background information, and does not constitute an admission of prior art.

SUMMARY

One aspect of the invention provides an atomic force microscope (AFM) probe, which comprises: an elastically deformable frame having a fixed end and a movable end on one axis, wherein the movable end is configured to move along the axis relative to the fixed end; an AFM tip connected to the movable end and movable toward and away from a test sample along the axis; and a stopper configured to limit or dampen the movement of the movable end toward the fixed end depending upon a relative position of the movable end to the fixed end.

In the foregoing probe, the frame may comprise a first arm and second arm both extending between the fixed end and the movable, wherein the first and second arms define an opening therebetween, wherein the structure is attached to at least one of the first and second arms and located within the opening.

Another aspect of the invention provides a method of measuring hardness of a sample, which comprises: providing the foregoing probe; providing a sample under the probe; and moving the sample and the probe close to each other such that the stopper begins to limit or dampen the movement of the movable end of the frame so as to conduct a nano-indentation test.

An aspect of the present invention is to provide an AFM probe that employs a means for controlling elastic deformation of a frame and a resultant movement of an AFM tip within predetermined ranges, thereby allowing a mechanical property test (particularly, a nano-indentation test) of a test sample and a surface topography test of a test sample to be performed with different stiffness.

The atomic force microscope (AFM) probe comprises an elastically deformable frame having a fixed end and a movable end on one axis; an AFM tip supported by the movable end to be movable against a test sample in a direction of the axis; and a stopper provided on an inner surface of the frame to control a movement of the AFM tip within a predetermined range.

The frame may comprise a first portion on a side of the fixed end and a second portion on a side of the movable end, and the stopper may be provided between the first portion and the second portion. Further, the stopper may have a leading end with a point-contactable or surface-contactable shape. The point-contactable shape may be a spherical shape, and the surface-contactable shape may be a side surface shape of a cylinder.

The stopper may comprise at least one pair of stopper members installed at the first portion and the second portion to face each other, or at least one stopper member installed at the first or second portion to face the inner surface of the frame. At this time, the stopper may comprise one or two stopper members positioned on the axis, and stopper members symmetrical with each other with respect to the axis.

The stopper may be configured such that the position thereof can be changed in a direction perpendicular to the axis so as to control the range of movement of the AFM tip. Preferably, the stopper may comprise two pairs of stopper members installed in parallel with each other at opposite sides with respect to the axis.

The stopper may comprise a plurality of stopper members installed in parallel with one another and having different stiffness. Preferably, the plurality of stopper members may be installed at the first portion so as to pair with another plurality of stopper members installed at the second portion, and the stopper members of respective pairs may have predetermined different spacing therebetween. Preferably, among the plurality of stopper members, a stopper member that first controls the movement of the AFM tip may have stiffness lower than that of a stopper member that later controls the movement of the AFM tip. At this time, a stopper member closer to the axis may first control the movement of the AFM tip.

Further, a piezoelectric material may be provided at the stopper so as to measure a displacement of the AFM tip. The piezoelectric material may be provided at a leading end of the stopper member installed at the first portion and may be spaced apart from or in contact with the second portion.

Furthermore, the AFM tip may be made of an electrically conductive material. Preferably, the frame may be configured to be symmetrical with respect to the axis. Preferably, the frame may have a diamond shape.

According to another embodiment of the present invention, the stopper may comprise first and second stopper members provided respectively on the first and second portions to face each other at positions coincident with the axis; the second stopper member may comprise a contact portion to be brought into contact with the first stopper member due to elastic deformation of the frame, and a pair of supports symmetrically and slantly connected from the contact portion to the second portion of the frame; and inclination angles of the supports may be adjusted to control stiffness required for an indentation test of a test sample.

BRIEF DESCRIPTION OF THE DRAWINGS

The above and other features and advantages of the present invention will become apparent from the following description of embodiments given in conjunction with the accompanying drawings, in which.

DESCRIPTION OF THE EMBODIMENTS

Various advantages of the present invention will be more clearly understood from the following description of embodiments.

Embodiment 1

Figure 1:
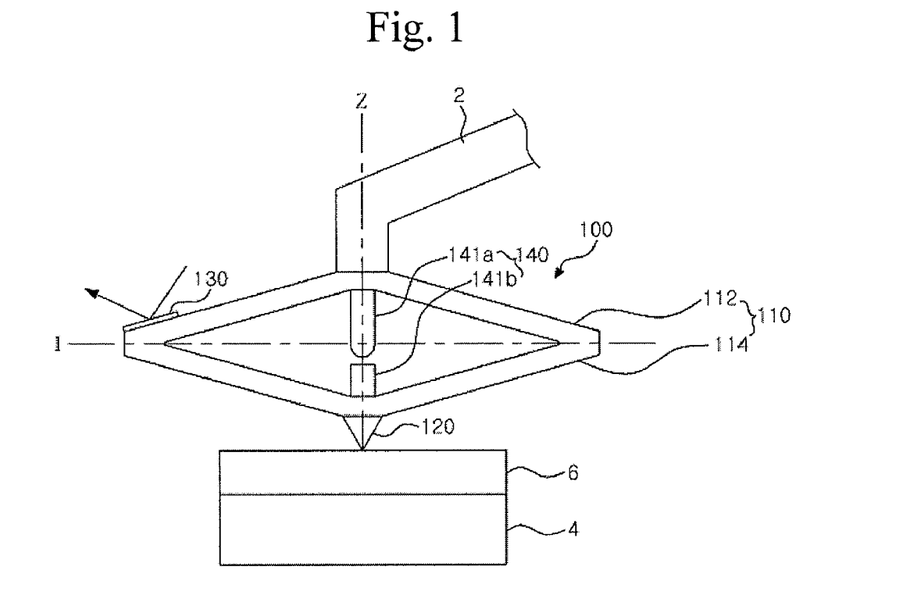
FIG. 1 is a view showing an AFM probe according to a first embodiment of the present invention.
Figure 2:
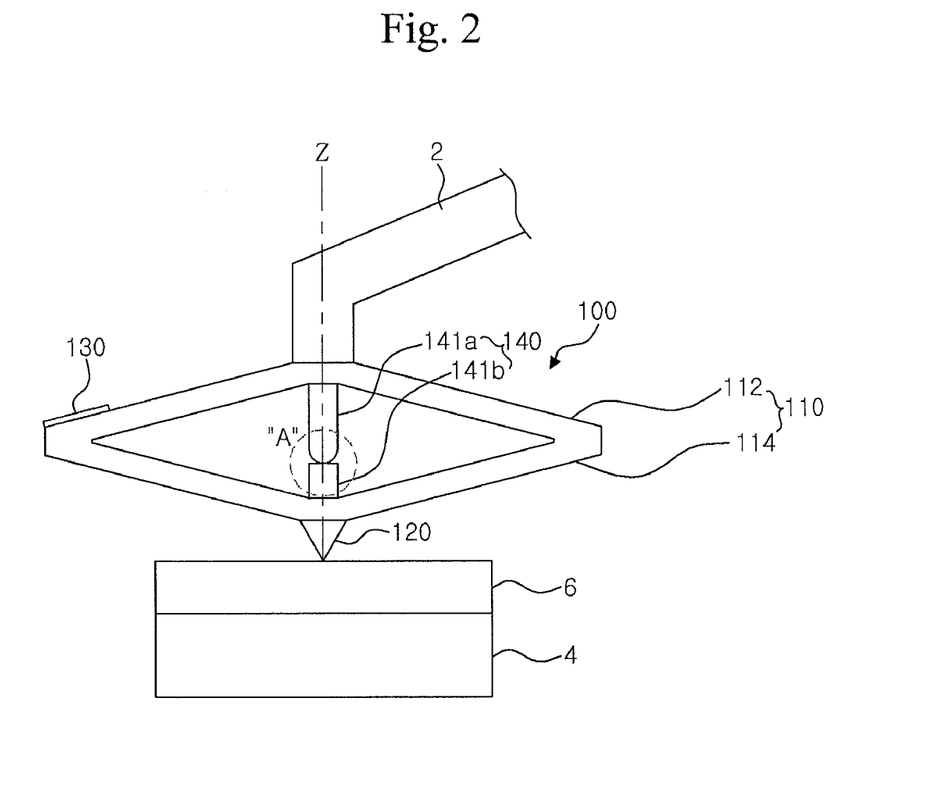
FIG. 2 is a view illustrating the operation of the AFM probe according to the first embodiment of the present invention.

FIGS. 1 and 2 are views illustrating an AFM probe according to a first embodiment of the present invention.

As shown in FIGS. 1 and 2, the AFM probe 100 includes a frame 110 and an AFM tip 120. The frame 110 has a diamond-shaped structure laterally symmetrical with respect to one axis, i.e., a Z-axis. An upper end, i.e., a fixed end, of the frame 110 is fixed to a probe support 2 that is a portion of an AFM, and the AFM tip 120 is installed at a lower end, i.e., a movable end, of the frame 110. At this time, the fixed and movable ends are positioned on the Z-axis. The AFM tip 120 is directed to a test sample 6 on a three-axis scanner, i.e., an XYZ scanner 4. FIG. 1 shows that the AFM tip 120 is in contact with the test sample 6.

When an interactive force is generated between the AFM tip 120 and the test sample 6, the frame 110 is elastically deformed in a direction that enables a vertical movement or displacement of the AFM tip 120. At this time, the frame 110 does not permit a horizontal movement or displacement of the AFM tip 120, since the frame 110 has the structure symmetrical with respect to the Z-axis and the fixed and movable ends thereof are positioned on the Z-axis. The interactive force between the AFM tip 120 and the test sample 6 may be generated when the XYZ scanner 4 moves upward in a Z-axis direction or the AFM probe 100 moves downward in the Z axis-direction.

The frame 110 may be made of any material such as a metal or a synthetic resin, which permits elastic deformation due to the structure defining an opening but is preferably made of a metallic material (particularly, stainless steel) with a larger modulus of elasticity and higher strength than other materials. In addition, the AFM tip 120 may be made of diamond or an electrically conductive material such as a metal. In particular, the AFM tip 120 made of an electrically conductive material may generate an electric signal upon application of a current thereto when it comes into contact with a surface of a test sample, particularly an electrically conductive test sample. This electric signal facilitates recognition of contact between the AFM tip 120 and the surface of the test sample 6 in a mechanical property test such as an indentation test of the test sample.

The frame 110 includes a first portion 112 on the side of the fixed end and a second portion 114 on the side of the movable end. In this embodiment, the first portion 112 and the second portion 114 are defined as upper and lower portions that are divided with respect to an imaginary line I for connecting right and left vertexes of the frame 110.

A mirror 130 for reflecting light emitted from a light source (not shown) of an AFM is mounted on an outer left surface of the first portion 112. The light reflected by the mirror 130 is directed to a light-receiving element (not shown) installed in the AFM. When an indentation test of a test sample is performed by moving the test sample in the Z-axis direction or moving the AFM probe 100 in the Z-axis direction using the three-axis scanner 4, an amount of movement of the AFM tip 120 can be found from a position where the light-receiving element receives light, and the indent depth of the AFM tip 120 into the test sample 6 can be measured from the amount of movement.

In case of the indentation test, the AFM probe 100 should have stiffness sufficient to indent the test sample 6. Meanwhile, when a surface topography of a test sample is intended to be performed by moving the test sample 6 in an X- or Y-axis direction using the three-axis scanner 4, the AFM probe 100 should have low stiffness. In order to meet the two contradictory conditions, the AFM probe 100 of this embodiment includes a stopper 140 that controls elastic deformation of the frame 110 and a resultant movement of the AFM tip 120 in the Z-axis direction within predetermined ranges.

In this embodiment, the stopper 140 includes a pair of stopper members 141a and 141b that are positioned substantially at the center of the frame 110, i.e., on the Z-axis, while being installed at the first portion 112 and the second portion 114, respectively. Since the pair of stopper members 141a and 141b are spaced apart by a predetermined distance from each other, the AFM probe 100 can be suitably used for a surface topography test of a test sample while having relatively low stiffness within a range in which the stopper members 141a and 141b are not brought into contact with each other as shown in FIG. 1. In addition, the stopper members 141a and 141b increase the stiffness of the AFM probe 100 while being in contact with each other as shown in FIG. 2. In this state, the AFM probe 100 can be suitably used for an indentation test of a test sample.

The stopper members 141a and 141b may have stiffness for completely suppressing elastic deformation of the frame 110 at the position where the stopper members are in contact with each other. On the contrary, the stopper members may have stiffness for permitting slight elastic deformation of the frame 110.

Figure 3:
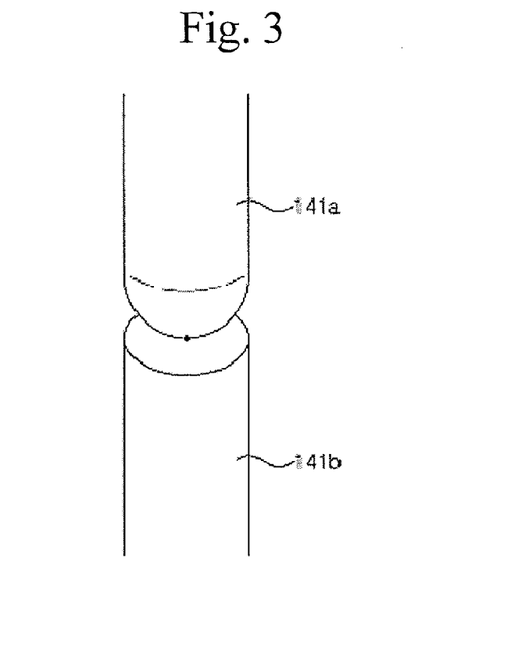
FIG. 3 is an enlarged view showing portion A in FIG. 2.

FIG. 3 is an enlarged view showing portion A in FIG. 2, illustrating shapes of the stopper members 141a and 141b. Referring to FIG. 3, the upper stopper member 141a has a leading end in an approximately spherical shape. With this configuration, the upper stopper member 141a may be substantially in point contact with a planar surface of the lower stopper member 141b, and this point contact between the stopper members 141a and 141b can prevent or decrease inaccuracy, which may be caused by a smoothness error between two contacting surfaces, in an indentation test of a test sample. The leading end of the stopper member may be formed to have a shape corresponding to a side surface of a cylinder instead of the spherical shape. In this case, the leading end of the stopper member may be brought into line contact with a portion facing the leading end.

Embodiment 2

Figure 4:
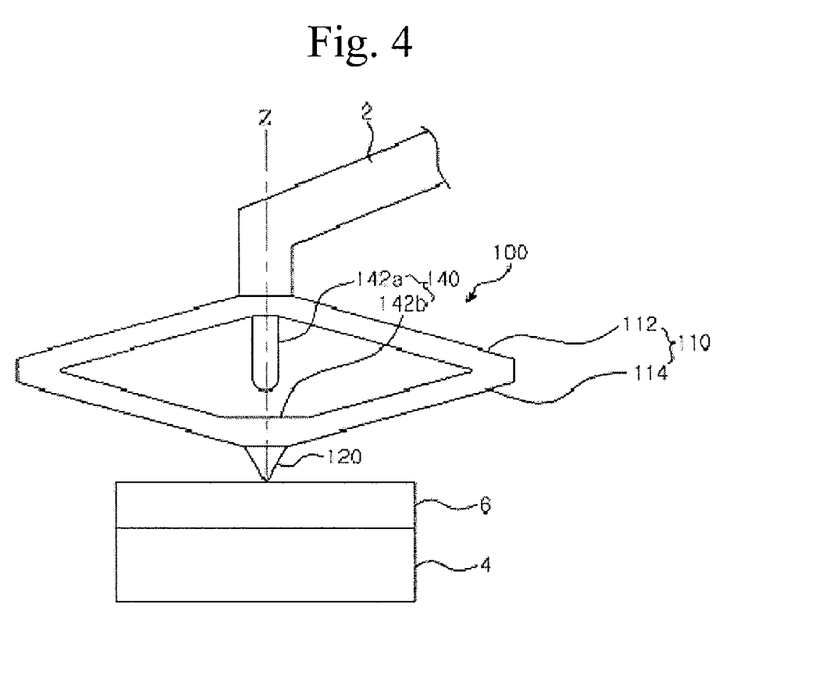
FIG. 4 is a view showing an AFM probe according to a second embodiment of the present invention.

FIG. 4 is a view showing an AFM probe according to a second embodiment of the present invention. The AFM probe 100 of this embodiment shown in FIG. 4 is substantially identical to that of the first embodiment, except the configuration of the stopper 140. Contrary to the first embodiment, the stopper 140 in this embodiment includes only one stopper member 142a installed at the first portion 112 of the frame 110. This stopper member 142a is positioned on the Z-axis in the same manner as that in the first embodiment. In addition, the stopper member 142a faces an inner surface of the frame 110, more particularly a smooth surface 142b inside an end of the second portion 114. Thus, in a state where the stopper member 142a is in contact with the smooth surface 142b, the stiffness of the frame 110 is increased as compared with a non-contact state. Thus, in the contact state, the AFM probe 100 has sufficient stiffness required for an indentation test of a test sample.

Embodiment 3

Figure 5:
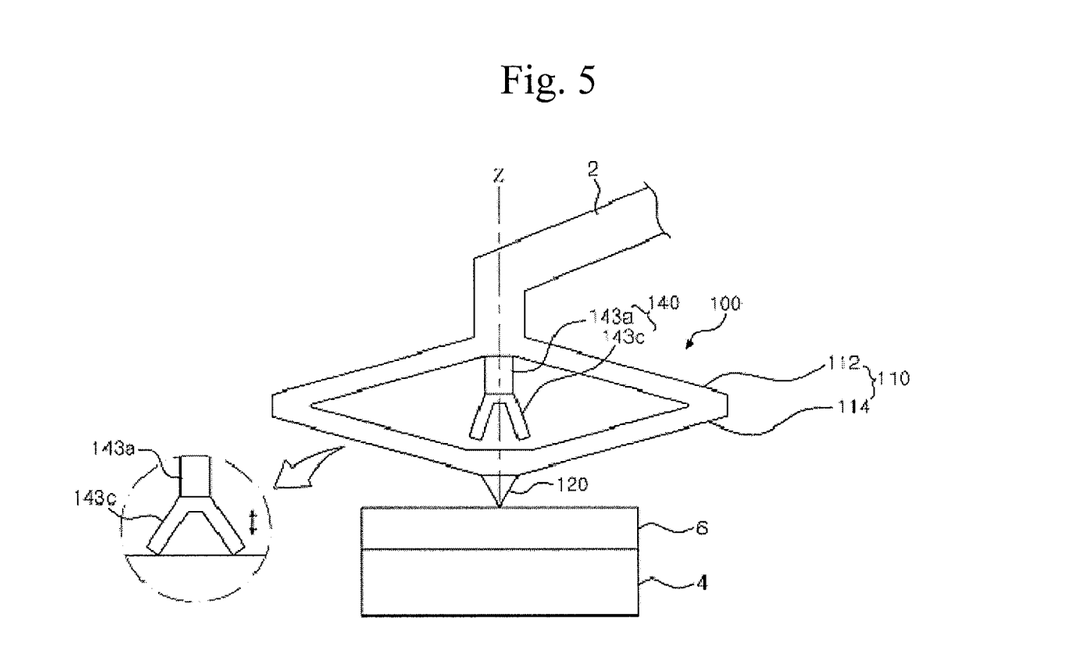
FIG. 5 is a view showing an AFM probe according to a third embodiment of the present invention.

FIG. 5 is a view showing an AFM probe according to a third embodiment of the present invention. The AFM probe 100 of this embodiment shown in FIG. 5 is substantially identical to that of the second embodiment in their configurations, except that the stopper 140 has a piezoelectric material 143c at a leading end of the stopper member 143a. The piezoelectric material 143c is a portion of the leading end of the stopper member 143a, which is to be brought into contact with an inner surface of the movable end of the frame 110. Before the stopper member 143a controls elastic deformation of the frame 110 with high stiffness, the piezoelectric material 143c can be first elastically deformed while coming into contact with the inner surface of the frame 110. The piezoelectric material 143c can outputs different voltage signals according to changes in the amount of deformation of the piezoelectric material itself in a state where a current is applied thereto. By using the voltage signals, it is possible to calculate the displacement of the AFM tip 120.

In an initial phase shown in FIG. 5 before the frame 110 is deformed, the piezoelectric material 143c may be arranged to be spaced apart from the inner surface of the frame 110. However, the piezoelectric material may be arranged to be in contact with the inner surface of the frame 110. If the piezoelectric material is in contact with the inner surface of the frame in the initial phase, the piezoelectric material begins to be deformed substantially simultaneously when an interactive force is generated between the AFM tip 120 and the test sample 6. This can be conveniently used in recognizing a surface of a test sample using the AFM probe 100. If the piezoelectric material 143c is made of the same material as the stopper member 143a, the piezoelectric material 143c and the stopper member 143a may configure a single stopper 140. At this time, the stiffness of the AFM probe 100, which is required for an indentation test of a test sample, can be controlled by adjusting the angle of a lower end of the stopper 140.

Embodiment 4

Figure 6:
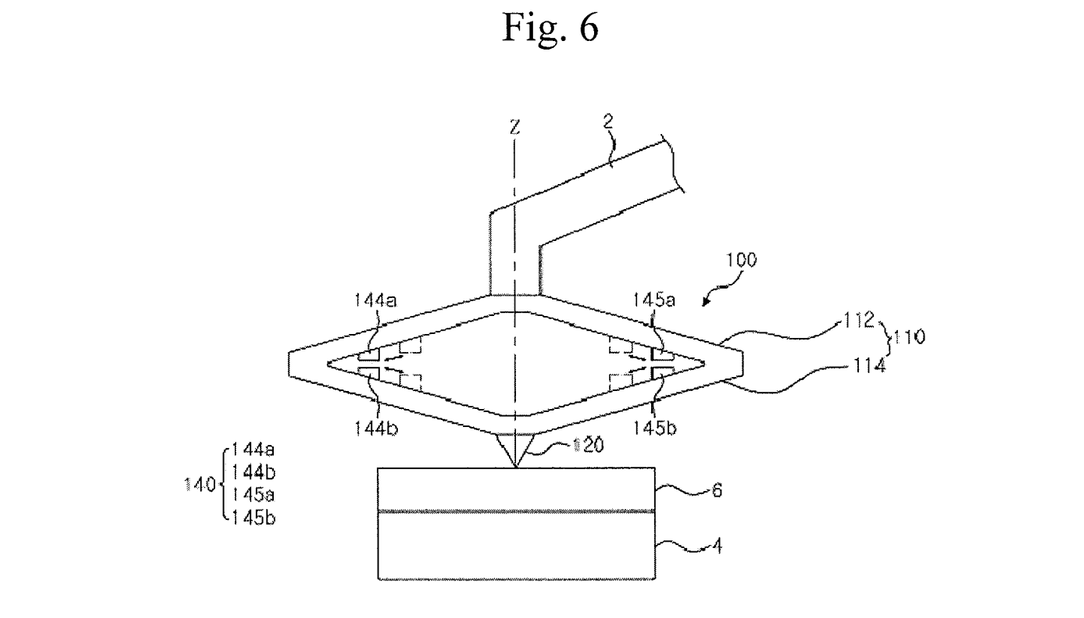
FIG. 6 is a view showing an AFM probe according to a fourth embodiment of the present invention.

FIG. 6 is a view showing an AFM probe according to a fourth embodiment of the present invention. Referring to FIG. 6, two pairs of stopper members 144a and 144b, and 145a and 145b are installed on inner surfaces of the frame 110. Among them, one pair of stopper members 144a and 144b are installed respectively at the upper first portion 112 of the frame 110 and the lower second portion of the frame 110 to face each other while being positioned at a left side with respect to the Z-axis. The other pair of stopper members 145a and 145b are installed respectively at the upper first portion 112 of the frame 110 and the lower second portion of the frame 110 to face each other while being positioned at a right side with respect to the Z-axis.

At this time, if the first pair of stopper members 144a and 144b and the second pair of stopper members 145a and 145b are moved along the inner surfaces of the frame 110, lateral spacing between the pairs is adjusted and spacing between the stopper members vertically facing each other is also adjusted. With this spacing adjustment, a point of time and a position at which the stiffness of the AFM probe 100 is changed can be changed upon test of a test sample. At this time, the first and second pairs of stopper members 144a and 144b, and 145a and 145b are positioned to be always symmetrical with each other with respect to the Z-axis. Here, the spacing adjustment for the stopper members may be implemented by sliding the stopper members along the inner surfaces of the frame or by detaching the stopper members from the inner surfaces of the frame and subsequently attaching the stopper members at different positions.

Although the AFM probe 100 having the two pairs of stopper members 144a and 144b, and 145a and 145b has been illustrated in this embodiment, it is also possible to provide an AFM probe including more pairs of stopper members. Further, an AFM probe including plural pairs of stopper members without a spacing adjustment function also falls within the scope of the present invention.

Embodiment 5

Figure 7:
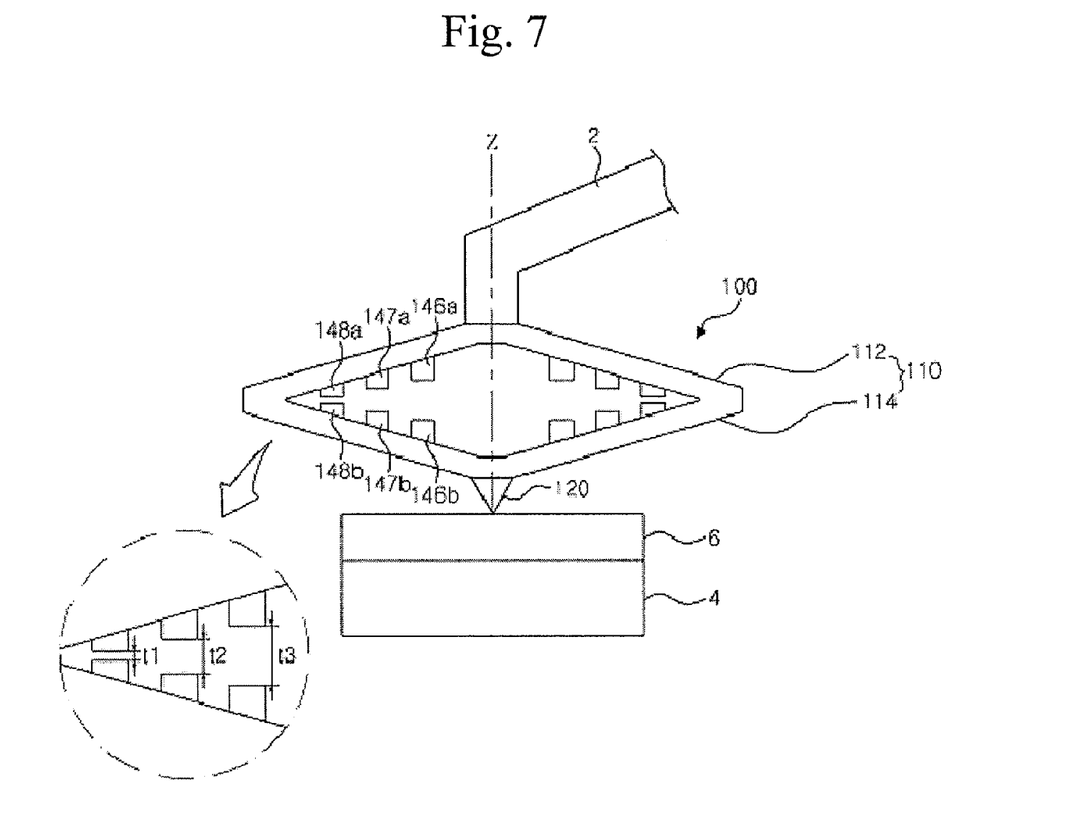
FIG. 7 is a view showing an AFM probe according to a fifth embodiment of the present invention.

FIG. 7 is a view showing an AFM probe according to a fifth embodiment of the present invention. Referring to FIG. 7, a plurality of stopper members 146a, 146b, 147a, 147b, 148a and 148b are installed respectively at the first and second portions 112 and 114 of the frame 110 such that they are symmetrical with each other with respect to the Z-axis. That is, the upper stopper members 146a, 147a and 148a are installed at the first portion 112, and the lower stopper members 146b, 147b and 148b are installed at the second portion 114 to face the corresponding upper stopper members 146a, 147a and 148a.

At this time, the stopper members are designed to have lower stiffness as the distance from the Z-axis increases. That is, the first pair of stopper members 146a and 146b nearest to the Z-axis has highest stiffness, and the third pair of stopper members 148a and 148b farthest from the Z-axis has lowest stiffness. The stiffness of the second pair of stopper members 147a and 147b is lower than that of the first pair of stopper members 146a and 146b but higher than that of the third pair of stopper members 148a and 148b. In addition, spacing (t1, t2 or t3) between the stopper members of each pair is determined differently. That is, the spacing t3 between the stopper members 146a and 146b of the first pair is largest, and the spacing t1 between the stopper members 148a and 148b of the third pair is smallest.

In this embodiment, while the frame 110 is elastically deformed to permit the movement of the AFM tip 120 in the Z-axis direction, the stiffness of the AFM probe 100 is changed firstly at a position where the stopper members 146a and 146b of the first pair come into contact with each other, secondly at a position where the stopper members 147a and 147b of the second pair come into contact with each other, and thirdly at a position where the stopper members 148a and 148b of the third pair come into contact with each other. At this time, the multi-stage stiffness change may also be implemented by differentiating only the spacing of the stopper members of each pair while making the stiffness of each of the stopper members constant. As the number of stopper members having the same stiffness, which are involved in control of the elastic deformation of the frame, is increased, the stiffness of the AFM probe 100 is also increased.

Furthermore, although not shown in the figure, the multi-stage stiffness change of the AFM probe may also be implemented by installing a plurality of stopper members at the first or second portion of the frame and differentiating the spacing between the plurality of stopper members and the inner surface of the frame that is to be brought into contact with the stopper members.

Embodiment 6

Figure 8:
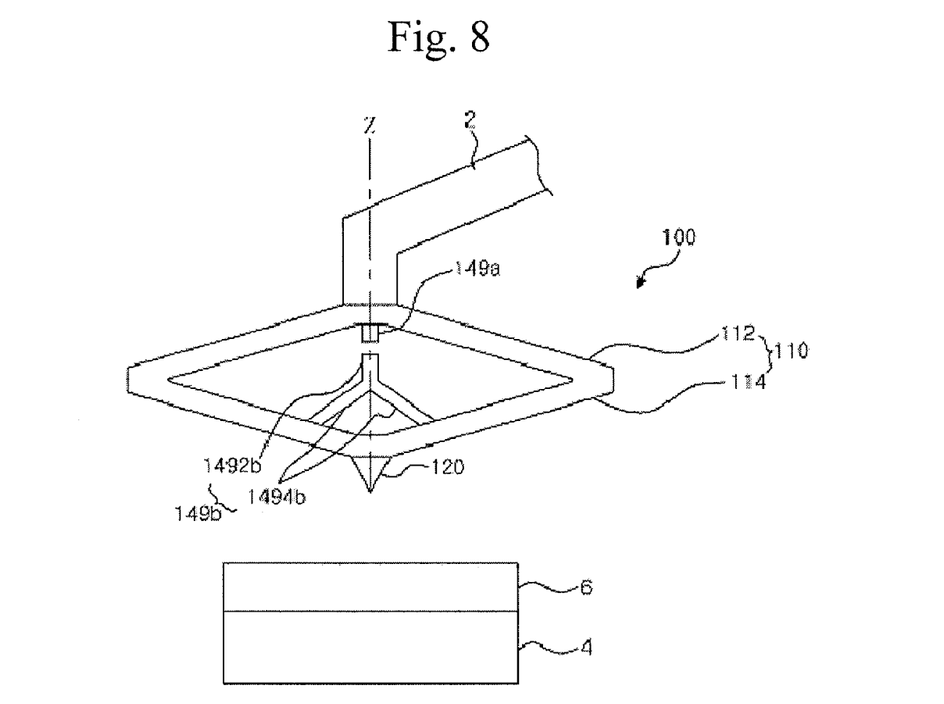
FIG. 8 is a view showing an AFM probe according to a sixth embodiment of the present invention.

FIG. 8 is a view showing an AFM probe according to a sixth embodiment of the present invention. Referring to FIG. 8, first and second stopper members 149a and 149b facing each other are provided along the Z-axis at the first and second portions 112 and 114 of the frame 110, respectively. In addition, both of the first stopper member 149a and the second stopper member 149b are positioned on the Z-axis.

The first stopper member 149a is configured as a whole to vertically extend from an upper end thereof connected to the first portion 112 of the frame 110 to a lower end thereof, so that the entire first stopper member 149a is coincident with the Z-axis. On the contrary, the second stopper member 149b includes a contact portion 1492b that comes into direct contact with the first stopper member 149a, and a pair of supports 1494b and 1494b connected to the second portion 114 of the frame 110 to variably support the contact portion 1492b. The contact portion 1492b always exists at a position that is coincident with the Z-axis, and the supports 1494b and 1494b are slantly connected from the contact portion 1492b to the second portion 114. In addition, the supports 1494b and 1494b are arranged symmetrically with respect to the Z-axis, and the inclination angles of the supports 1494b can be adjusted with respect to the Z-axis while maintaining the symmetry.

With the structure for adjusting the inclination angle, the height of the second stopper member 149b can be changed. The height change can permit control of spacing between the first stopper member 149a and the second stopper member 149b and control of the stiffness of the AFM probe associated with the spacing. At this time, the first stopper member 149a is preferably as short as possible in length. This is because the first stopper member 149a contributes to widening a height adjustment range of the lower stopper member 149, which is required for adjusting the inclination angles of the supports 1494b and 1494b of the second stopper member 149b.

Embodiment 7

Figure 9:
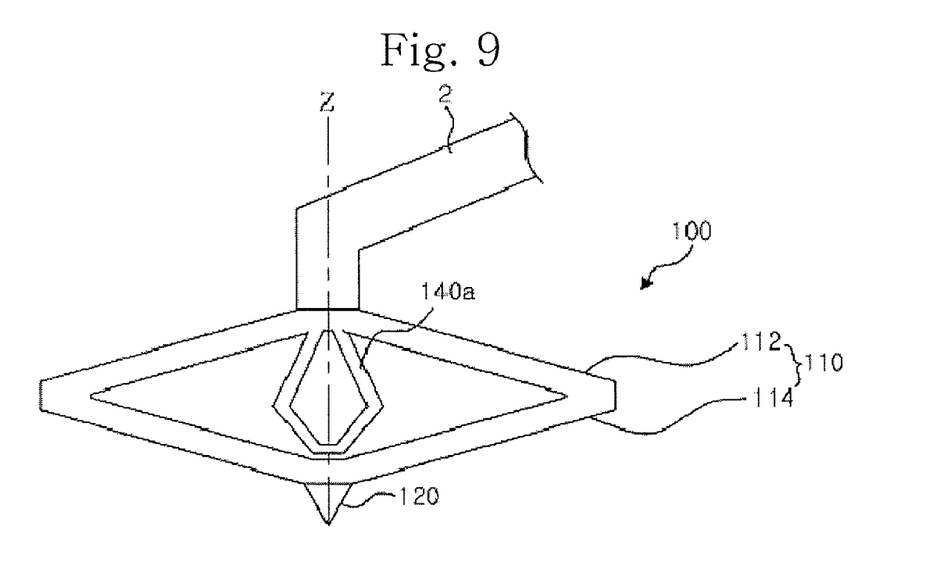
FIG. 9 is a view showing an AFM probe according to a seventh embodiment of the present invention.

FIG. 9 is a view showing an AFM probe according to a seventh embodiment of the present invention. Referring to FIG. 9, a stopper member 140a provided at the first portion 112 of the frame 110 is constructed of a frame structure defining an opening. This stopper member 140a is positioned on the Z-axis, and a lower end thereof is spaced apart by a predetermined distance from a lower end of the second portion 114 of the frame 110. The stopper member 140a can be elastically deformed within a predetermined range due to the frame structure when the lower end of the stopper member is pressed by the second portion 114 of the frame 110. Generally, the stiffness of the stopper member 140a with the frame structure is higher than that of the frame 110, and the stopper member 140a may be designed to have desired stiffness by controlling the length, thickness or shape of the frame structure.

Although not described in the embodiments, the frame 110 may have a circular, elliptical or any other symmetrical structure defining an opening, in addition to the diamond-shaped structure.

Since the AFM probe according to embodiments of the present invention has variable stiffness depending on the kind of test, the AFM probe can be used in common for a surface topography test of a test sample requiring low stiffness and an indentation test of a test sample requiring high stiffness.

What is claimed is:

1. An atomic force microscope (AFM) probe, comprising:
an elastically deformable frame having a fixed end and a movable end that are aligned in one axis, wherein the movable end is configured to move along the axis relative to the fixed end;
an AFM tip connected to the movable end and movable toward and away from a test sample along the axis; and
a stopper configured to limit or dampen the movement of the movable end toward the fixed end depending upon a relative position of the movable end to the fixed end,
wherein the frame comprises a first arm and a second arm diverging from each other at a first position located on the axis and converging at a second position located on the axis, the first and second arms defining an opening therebetween, wherein the first arm comprises a first elastically deformable arm section extending from the first position, and a second elastically deformable arm section extending from the second position, the first and second arm sections meeting at a third position with a first angle therebetween, wherein the second arm comprises a third elastically deformable arm section extending from the first position, and a fourth elastically deformable arm section extending from the second position, the third and fourth arm sections meeting at a fourth position with a second angle therebetween, wherein the stopper is located within the opening.

2. The AFM probe as claimed in claim 1, wherein the AFM tip is made of an electrically conductive material.

3. The AFM probe as claimed in claim 1, wherein the frame is configured to be symmetrical with respect to the axis.

4. The AFM probe as claimed in claim 3, wherein the frame has a diamond shape.

5. The AFM probe as claimed in claim 1, wherein the stopper comprises a stopper member having a leading end shaped to come into linear contact or surface contact with a facing surface.

6. A method of measuring hardness of a sample, the method comprising:
  providing the probe of claim 1;
  providing a sample under the probe; and
  moving the sample and the probe close to each other such that the stopper begins to limit or dampen the movement of the movable end of the frame so as to conduct a nano-indentation test.

7. The AFM probe as claimed in claim 1, wherein the stopper is configured to contact an opposing surface as the movable end moves toward the fixed end.

8. An atomic force microscope (AFM) probe, comprising:
  an elastically deformable frame having a fixed end and a movable end that are aligned in one axis, wherein the movable end is configured to move along the axis relative to the fixed end;
  an AFM tip connected to the movable end and movable toward and away from a test sample along the axis; and
  a stopper configured to limit or dampen the movement of the movable end toward the fixed end depending upon a relative position of the movable end to the fixed end,
  wherein the frame comprises a first arm and a second arm diverging from each other at a first position located on the axis and converging at a second position located on the axis, the first and second arms defining an opening therebetween,
  wherein the first arm comprises a first elastically deformable arm section extending from the first position, and a second elastically deformable arm section extending from the second position, the first and second arm sections meeting at a third position with a first angle therebetween,
  wherein the second arm comprises a third elastically deformable arm section extending from the first position, and a fourth elastically deformable arm section extending from the second position, the third and fourth arm sections meeting at a fourth position with a second angle therebetween,
  wherein the frame comprises a first portion which comprises the first and third elastically deformable arm sections, and a second portion which comprises the second and fourth elastically deformable arm sections, and wherein the stopper is provided between the first portion and the second portion.

9. The AFM probe as claimed in claim 8, wherein the stopper comprises at least one pair of stopper members installed at the first portion and the second portion so as to face each other.

10. The AFM probe as claimed in claim 9, wherein the stopper member has a frame structure.

11. The AFM probe as claimed in claim 8, wherein the stopper comprises at least one stopper member installed at the first or second portion so as to face the inner surface of the frame.

12. The AFM probe as claimed in claim 8, wherein the stopper is positioned on the axis.

13. The AFM probe as claimed in claim 8, wherein the stopper is configured such that the position thereof can be changed in a direction perpendicular to the axis so as to control the range of movement of the AFM tip.

14. The AFM probe as claimed in claim 13, wherein the stopper comprises two pairs of stopper members installed in parallel with each other at opposite sides with respect to the axis.

15. The AFM probe as claimed in claim 8, wherein the stopper comprises a plurality of stopper members installed in parallel with one another and having different stiffness.

16. The AFM probe as claimed in claim 15, wherein the plurality of stopper members are installed at the first portion so as to pair with another plurality of stopper members installed at the second portion, and the stopper members of respective pairs have predetermined different spacing therebetween.

17. The AFM probe as claimed in claim 15, wherein, among the plurality of stopper members, a stopper member that first controls the movement of the AFM tip has stiffness lower than that of a stopper member that later controls the movement of the AFM tip.

18. The AFM probe as claimed in claim 17, wherein a stopper member closer to the axis first controls the movement of the AFM tip.

19. The AFM probe as claimed in claim 8, wherein a piezoelectric material is provided at the stopper so as to measure a displacement of the AFM tip.

20. The AFM probe as claimed in claim 19, wherein the piezoelectric material is provided at a leading end of the stopper member installed at the first portion and is spaced apart from the second portion.

21. The AFM probe as claimed in claim 19, wherein the piezoelectric material is provided at a leading end of the stopper member installed at the first portion and is in contact with the second portion.

22. The AFM probe as claimed in claim 8, wherein the stopper comprises stopper members symmetrical with each other with respect to the axis.

23. The AFM probe as claimed in claim 8, wherein the stopper comprises a piezoelectric material provided at a leading end thereof and a stopper member made of the same material as the piezoelectric material to support the piezoelectric material, and an angle of the leading end of the stopper where the piezoelectric material is positioned is adjusted to control stiffness required for an indentation test of a test sample.

24. The AFM probe as claimed in claim 8, wherein the stopper comprises first and second stopper members provided respectively on the first and second portions so as to face each other at positions coincident with the axis, the second stopper member comprises a contact portion to be brought into contact with the first stopper member due to elastic deformation of the frame, and a pair of supports symmetrically and slantly connected from the contact portion to the second portion of the frame, and inclination angles of the supports are adjusted to control stiffness required for an indentation test of a test sample.

* * * * *